US012705438B2

(12) United States Patent
Shtar et al.

(10) Patent No.: US 12,705,438 B2
(45) Date of Patent: Aug. 11, 2026

(54) HALLUCINATION DETECTION VIA MULTILINGUAL PROMPT

(71) Applicant: INTUIT INC., Mountain View, CA (US)

(72) Inventors: Guy Shtar, Ness Ziona (IL); Yair Horesh, Kfar-Saba (IL); Ron Bitton, Hod Hasharon (IL)

(73) Assignee: INTUIT INC., Mountain View, CA (US)

( * ) Notice: Subject to any disclaimer, the term of this patent is extended or adjusted under 35 U.S.C. 154(b) by 148 days.

(21) Appl. No.: 18/617,985

(22) Filed: Mar. 27, 2024

(65) Prior Publication Data

US 2025/0307572 A1 Oct. 2, 2025

(51) Int. Cl.
*G06F 40/58* (2020.01)

(52) U.S. Cl.
CPC .................................... *G06F 40/58* (2020.01)

(58) Field of Classification Search
CPC ....... G06F 40/58; G06F 40/30; G06N 3/0475; G06N 20/00
See application file for complete search history.

(56) References Cited

U.S. PATENT DOCUMENTS 12,400,652 B1 * 8/2025 Fan ..................... G10L 15/1822
2022/0237391 A1 * 7/2022 Zhang ................... G06F 40/284
2024/0296279 A1 * 9/2024 Gardner ................ G06F 16/338
2025/0147990 A1 * 5/2025 Mathis .................... G06F 40/30
2025/0148192 A1 * 5/2025 Shahid .................... G06F 40/30
2025/0209276 A1 * 6/2025 Watson ................... G06F 9/543
2025/0232780 A1 * 7/2025 He .......................... G10L 15/16
2025/0238629 A1 * 7/2025 Malkiel ................. G06F 40/194
2025/0272604 A1 * 8/2025 Coutinho ............... G06N 20/00
2025/0298821 A1 * 9/2025 Yu ........................ G06F 16/3344
2025/0298839 A1 * 9/2025 Banerjee ............... G06F 16/535

* cited by examiner

*Primary Examiner* — Mark Villena

(74) *Attorney, Agent, or Firm* — Patterson + Sheridan, LLP

(57) ABSTRACT

Aspects of the present disclosure relate to detecting hallucinations in language model outputs. Embodiments include receiving a user query. Embodiments further include prompting a language processing machine learning model to generate responses to the user query in each language of a set of multiple languages. Embodiments further include receiving the responses from the language processing machine learning model in response to the prompting. Embodiments further include creating embedding representations of the responses. Embodiments further include calculating, based on the embedding representations, a degree of semantic similarity between the responses. Embodiments further include determining that a response of the responses contains a model hallucination based on comparing the degree of semantic similarity between the responses to a threshold.

20 Claims, 4 Drawing Sheets

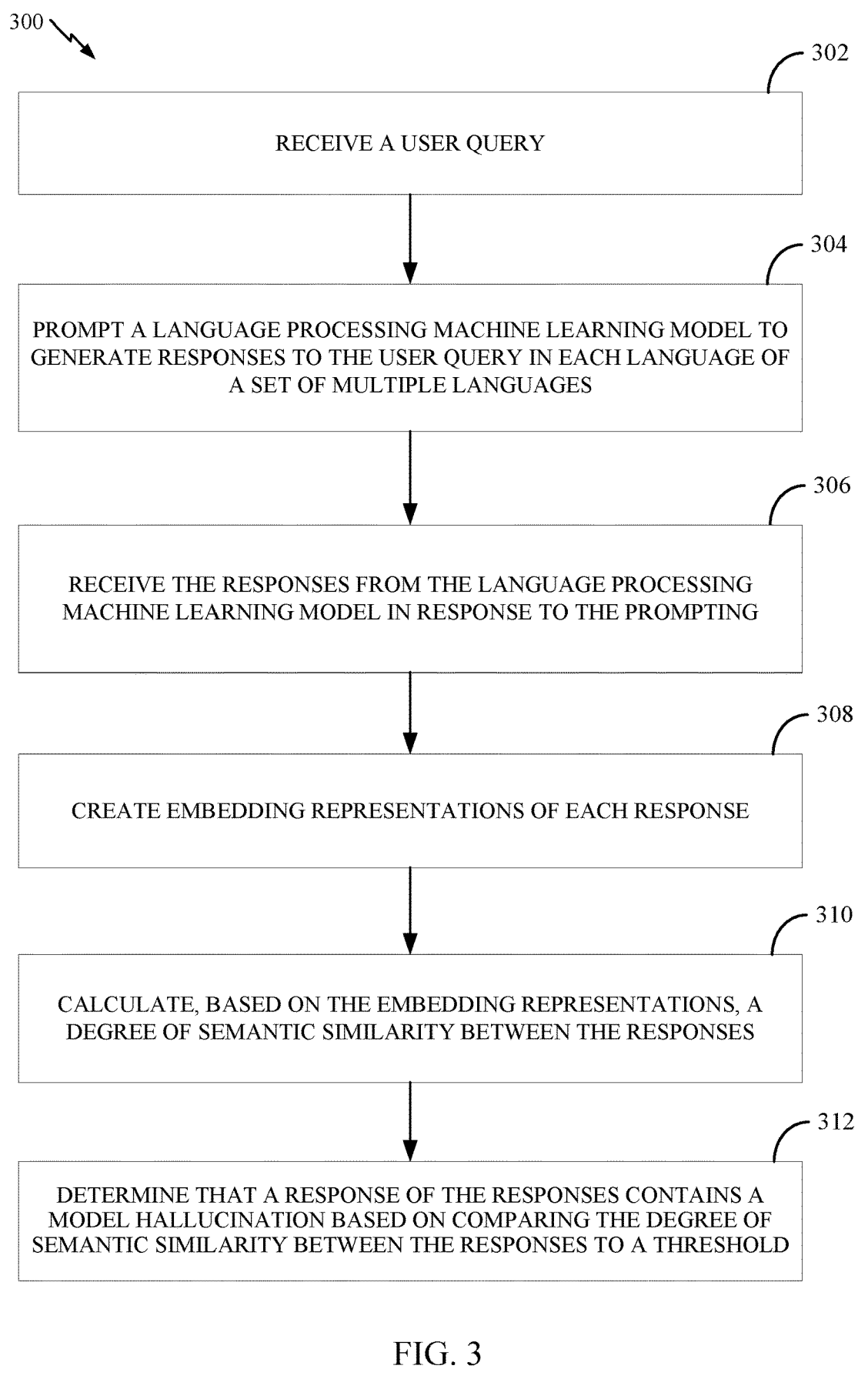

300

302
RECEIVE A USER QUERY

304
PROMPT A LANGUAGE PROCESSING MACHINE LEARNING MODEL TO GENERATE RESPONSES TO THE USER QUERY IN EACH LANGUAGE OF A SET OF MULTIPLE LANGUAGES

306
RECEIVE THE RESPONSES FROM THE LANGUAGE PROCESSING MACHINE LEARNING MODEL IN RESPONSE TO THE PROMPTING

308
CREATE EMBEDDING REPRESENTATIONS OF EACH RESPONSE

310
CALCULATE, BASED ON THE EMBEDDING REPRESENTATIONS, A DEGREE OF SEMANTIC SIMILARITY BETWEEN THE RESPONSES

312
DETERMINE THAT A RESPONSE OF THE RESPONSES CONTAINS A MODEL HALLUCINATION BASED ON COMPARING THE DEGREE OF SEMANTIC SIMILARITY BETWEEN THE RESPONSES TO A THRESHOLD

FIG. 3

HALLUCINATION DETECTION VIA MULTILINGUAL PROMPT

INTRODUCTION

Aspects of the present disclosure relate to techniques for detecting hallucinations in language model outputs. In particular, techniques described herein involve prompting a language model to generate responses to a query in different languages, calculating the semantic similarity of the responses, making a determination as to whether hallucination occurred based on the calculated semantic similarity, and then performing one or more actions based on the determination.

BACKGROUND

A growing number of people, businesses, and organizations around the world utilize language models to assist with a wide variety of tasks. For example, an individual may request that a language model generate a certain type of content, and the language model may generate the content based on the request.

Language models are generally trained to generate natural language content using corpuses that include content written in various natural languages. However, due to deficiencies in the models and/or the corpuses on which they are trained, the content generated by the language models may contain hallucinations. Hallucinations occur when a language model creates false, misleading, and/or inaccurate information. For example, a user may ask a language model to answer a question, and the language model may fabricate an incorrect, yet in some cases convincing, answer. It can be difficult to detect when hallucinations occur, either manually (e.g., due to the convincingness of hallucinatory content) or automatically (e.g., due to the lack of a source of truth against which to automatically compare such content). This difficulty can drastically reduce the utility of language models. For example, if a language model generates false information, then users may not be able to rely on content generated by the model unless they first verify the accuracy of the content. When users are required to manually verify the outputs of a language model, much of the convenience and efficiency of using the language model to automatically generate content may be lost. Existing technological solutions for preventing hallucinations involve manually detecting hallucinations and then modifying and/or re-training language models to reduce and/or eliminate hallucinations. Such re-training and modification of a language model may often be impractical for particular users and/or particular applications. Also, such manual identification of hallucinations can be unreliable and inefficient. There is currently no reliable way to automatically detect hallucinations in content generated by a language model. Thus, there is a need in the art for detecting hallucinations in language model outputs.

BRIEF SUMMARY

Certain embodiments provide a method of detecting hallucinations in language model outputs. The method generally includes: receiving a user query; prompting a language processing machine learning model to generate responses to the user query in each language of a set of multiple languages; receiving the responses from the language processing machine learning model in response to the prompting; creating embedding representations of the responses; calculating, based on the embedding representations, a degree of semantic similarity between the responses; and determining that a response of the responses contains a model hallucination based on comparing the degree of semantic similarity between the responses to a threshold.

Other embodiments provide a method of detecting hallucinations in language model outputs. The method generally includes: receiving a user query; prompting a large language model (LLM) to generate responses to the user query in each language of a set of multiple languages, wherein one language of the set of multiple languages is a language associated with the user query; creating embedding representations of the responses; calculating, based on the embedding representations, a degree of semantic similarity between a response of the responses that is in the language associated with the user query and a different response of the responses that is in a different language than the language associated with the user query; determining that the response that is in the language associated with the user query contains a hallucination based on the degree of semantic similarity failing to meet a threshold; and generating a new response or a notification based on the determining that the response that is in the language associated with the user query contains the hallucination.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 depicts example operations related to detecting hallucinations in language model outputs.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
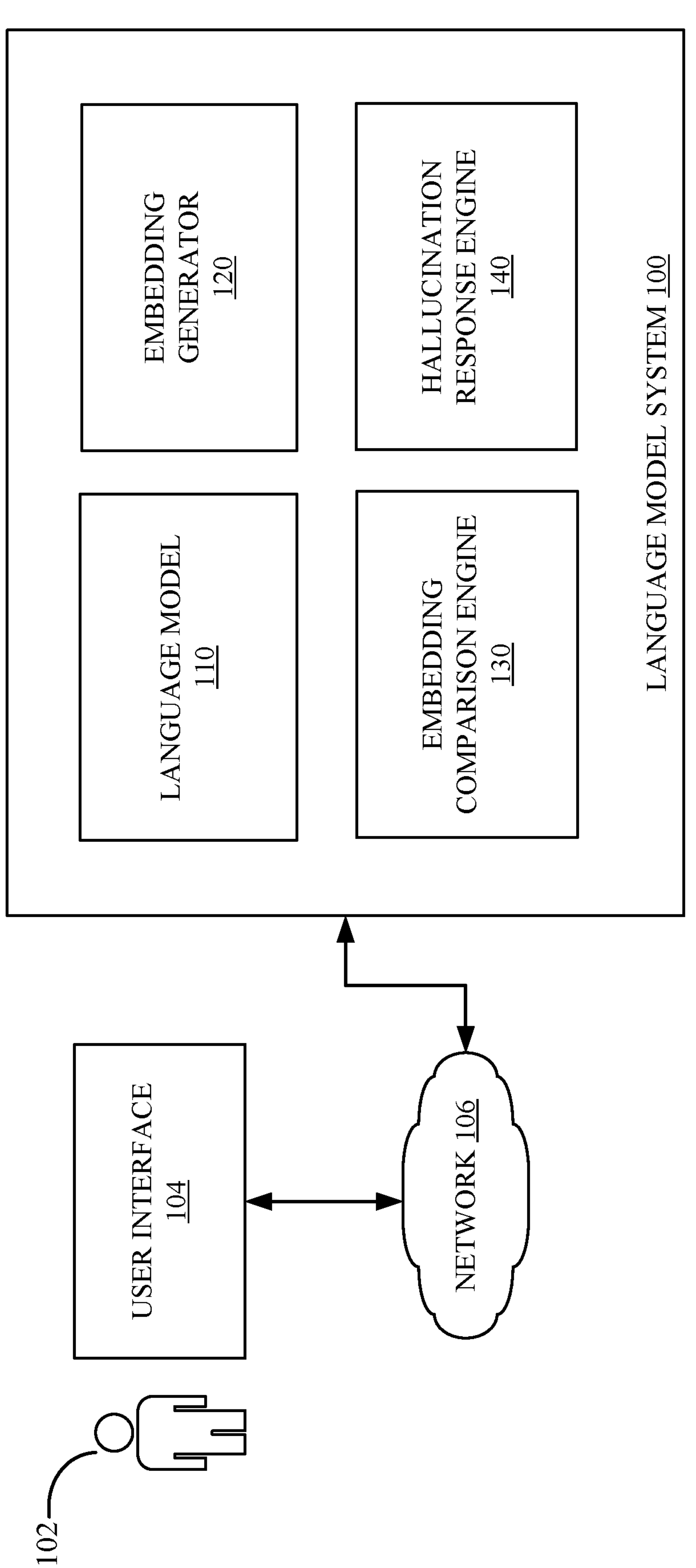
FIG. 1 depicts an example of computing components related to detecting hallucinations in language model outputs.

Aspects of the present disclosure provide apparatuses, methods, processing systems, and computer-readable mediums for automatically detecting hallucinations in language model outputs.

According to certain embodiments, a language model is prompted to generate responses to a user query in a set of multiple languages. Embedding representations of each response may be created, and the degree of similarity of between the embedding representations may be calculated. If the degree of similarity for the embeddings fails to meet a threshold, it may be determined that a hallucination has occurred. For example, a high degree of similarity between the embeddings may indicate that the responses in different languages are semantically similar. Semantic similarity of the responses across a multitude of languages may indicate that the response is based on consistent information across the various corpuses corresponding to each language. Non-hallucinatory responses are generally based on consistent information across multiple corpuses, whereas hallucinatory responses generally correspond to information having a higher degree of variance across corpuses. Thus, determining that responses to a query are consistent across multiple natural languages may indicate that the responses are not likely to contain a hallucination.

In some embodiments, a user query is received. User queries are generally natural language requests for a language model, such as a language processing machine learning model, to perform a task. The user query may comprise, for example, a question or a request to generate a certain type of content. The language model may comprise a machine learning model such as a Large Language Model (LLM) or a recurrent neural network (RNN).

Certain embodiments provide that the language model is prompted to generate responses to the user query in each language of a set of multiple languages. For example, this prompting may be accomplished by, for each given language, generating a prompt comprising the user query and instructions to answer the user query in the given language, and then providing the prompt to the language model. The language model may generate responses in each language of the set of languages. In some embodiments, the set of languages comprises a language associated with the user query (e.g., the language in which the user query was written) and one or more additional different languages.

According to some embodiments, vector representations such as embeddings may be created for each of the responses. An embedding generally refers to a vector representation of an entity that represents the entity as a vector in n-dimensional space such that similar entities are represented by vectors that are close to one another in the n-dimensional space. Embeddings may be generated through the use of an embedding model, such as a neural network or other type of machine learning model that learns a representation (embedding) for an entity through a training process that trains the neural network based on a data set, such as a plurality of features of a plurality of entities. Each response may be represented by a corresponding embedding vector.

Some embodiments provide that a degree of semantic similarity between the responses may be calculated. For example, the semantic similarity may be determined by calculating the average distance (e.g., Euclidean distance) between pairs of embeddings and/or the standard deviation of the distances between pairs of embeddings. In some embodiments, a clustering algorithm is applied to the embeddings to determine the semantic similarity. In one example, the embedding of the response in the target language (e.g., the language in which the user query was submitted) is compared to each of the other embeddings (e.g., corresponding to responses in other languages) in order to determine a set of distances (e.g., Euclidean distance), and the set of distances may be averaged and/or otherwise aggregated to determine a degree of similarity between the response in the target language and the responses in the other languages.

Certain embodiments provide that the results of determining a degree of similarity between responses may be used to determine whether or not one or more of the responses contains a hallucination. As discussed above, accurate responses (i.e., responses that do not contain hallucinations) are generally semantically consistent across multiple languages. In other words, non-hallucinatory responses generally convey the same semantic meaning regardless of the language in which the responses are generated. Responses with hallucinations, however, generally exhibit a large amount of variance compared to responses to the same query generated in different languages. For example, accurate responses are generally based on well-known factual information. Corpuses corresponding to different languages generally contain well-known factual information, allowing language models to generate semantically similar responses in the different languages based on this factual information upon which the language models were trained. However, a language model may produce a hallucinatory response by fabricating facts and other information based on the corpus used to train the model (e.g., by generating false or irrelevant information, such as based upon information from one or more such corpuses, for inclusion in the response). Since responses generated in different languages are based on different corpuses of information (i.e., different training text) and/or different training processes (e.g., the training iterations by which the language model is trained for each language may produce different results), it follows that information that is fabricated by the language model will generally be different in different languages.

In certain embodiments, the results of determining a degree of similarity between responses may be used to determine which languages to include in the set of languages. For example, a clustering algorithm may be used to determine that a particular language is more prone to causing hallucinations than other languages and/or that the particular language otherwise resulted in an outlier result in at least one case. A language may be prone to causing hallucinations because, for example, the corpus corresponding to the language is deficient. A languages that is prone to causing hallucinations may result in high degrees of variance between embeddings even when responses in other languages do not contain hallucinations. Thus, excluding the particular language from the set of languages may allow for more accurate hallucination detection (i.e., reduction of false positives). In other cases, if only one language is identified as an outlier in a set of responses in different languages, while the other responses in other languages are semantically similar to one another, the response in that one language may be identified as a hallucination, while the other responses in the other languages may be determined not to be hallucinations.

According to certain embodiments, the language model may be re-trained or fine-tuned based on a detected hallucination. For example, the language model may be an LLM, and one or more parameters of the LLM may be adjusted based on the detected hallucination. For instance, the temperature (a parameter that determines how much risk the LLM takes in generating content) of the LLM may be adjusted. As another example, the language model may be retrained using other machine learning techniques, such as supervised or semi-supervised learning. In a further example, information may be added to the corpus used to train the machine learning model based on the detected hallucination (e.g., information necessary for generating an accurate response to a particular query may be added to the corpus), and the machine learning model be re-trained based on the updated corpus.

In some embodiments, an indication may be provided to the user based on a detected hallucination. The indication may comprise a warning or notification that the response may contain a hallucination, or the indication may otherwise indicate to a user that the user should verify the accuracy of the response. Certain embodiments provide that the indication includes a cluster map generated by applying a clustering algorithm to embeddings of responses. The indication may include suggestions for improving the query in order to reduce or eliminate the hallucinations.

Some embodiments provide that one or more additional responses are generated based on a detected hallucination. For example, the language model may be provided with one or more of the previously generated responses along with an indication that a hallucination occurred. Based on these inputs, the language model may generate one or more altered responses (e.g., in one or more languages) that do not contain a hallucination. Embeddings may be generated for the altered responses to determine if the altered responses contain hallucinations. One or more responses (such as the previously generated responses) and/or one or more new prompts may also be provided to the language model after it has been re-trained or fine-tuned. For example, the language model may be an LLM that is fine-tuned to have a lower temperature, thus making the LLM less aggressive in making predictions. Embeddings may be generated for the responses generated by the fine-tuned or re-trained model to determine if these responses contain hallucinations.

Embodiments of the present disclosure provide numerous technical and practical effects and benefits. For instance, techniques described herein allow for accurate automated detection of hallucinations in language model outputs in a manner that was not possible with conventional techniques (e.g., due to the lack of a source of truth against which to automatically compare outputs from a language model). Enabling a language model system to automatically detect hallucinations in its outputs greatly enhances the utility of the language model system. For example, automated detection of hallucinations eliminates the need for manually verifying each output of a language model. As a result, teachings of the present disclosure allow for reliable automated content generation. Additionally, embodiments of the present disclosure provide for taking actions to prevent hallucinations and generate non-hallucinatory responses. For example: a language model may be re-trained or fine-tuned in response to detected hallucinations; an indication may be provided to users to help the users construct queries that are less likely to result in hallucinations; and/or additional responses may be generated such as using a revised query and/or by a re-trained or fine-tuned language model.

Example of Computing Components Related to Detecting Hallucinations in Language Model Outputs FIG. 1 depicts an example of computing components related to detecting hallucinations in language model outputs.

A user 102 may interact with a language model system 100 through a user interface 104. The user interface 104 may comprise a user interface corresponding to an application associated with a computing device belonging to the user 102. User interface 104 may be connected to language model system 100 over a network 106, such as the Internet or other connection over which data may be transferred.

Language model system 100, discussed in further detail below with respect to FIG. 2, may include one or more language models 110. Language model 110, discussed in further detail below with respect to FIG. 2, may comprise a machine learning model such as an LLM that is trained to generate responses to queries received from users. Queries may comprise, for example, questions or requests to generate content. A response may be generated in each language of a set of natural languages (e.g., English, Spanish, French, Mandarin, Hindi, Russian, Arabic, Portuguese, Italian, and/or the like).

Language model system 100 may include an embedding generator 120. Embedding generator 120, discussed in further detail below with respect to FIG. 2, may be configured to generate embedding representations of each response generated by language model 110.

Language model system 100 may include an embedding comparison engine 130. Embedding comparison engine 130, discussed in further detail below with respect to FIG. 2, may comprise one or more processors that are configured to compare embeddings generated by embedding generator 120.

Language model system 100 may include hallucination response engine 140. Hallucination response engine 140, discussed in further detail below with respect to FIG. 2, may comprise one or more processors that are configured to determine whether a hallucination has occurred in one or more responses generated by language model 110. Hallucination response engine 140 may be configured to retrain a language model 110 based on one or more detected hallucinations and/or to prompt a machine learning model 110 (e.g., after re-training or otherwise) to generate one or more new responses based on one or more detected hallucinations, such as with a new or updated query and/or with an indication that the previously generated response(s) were determined to contain a hallucination. Also, hallucination response engine 140 may be configured to provide an indication to user 102 that a response contains a hallucination.

Figure 2:
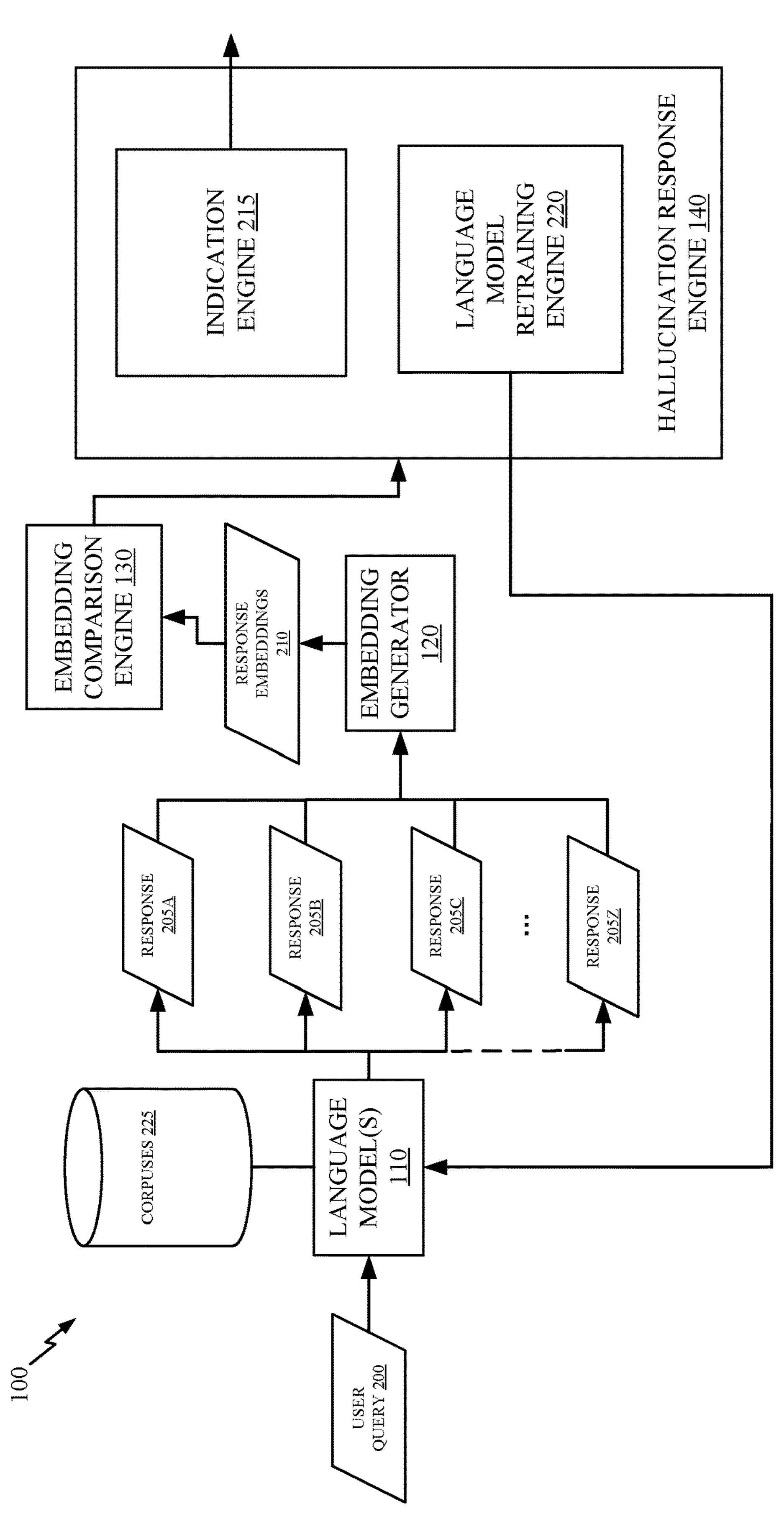
FIG. 2 depicts an example of computing components related to detecting hallucinations in language model outputs.

Example of Computing Components Related to Detecting Hallucinations in Language Model Outputs FIG. 2 depicts an additional example of computing components related to language model system 100 of FIG. 1.

User query 200 may be provided to a language model 110. User query 200 may comprise a question and/or a request to generate content. User query 102 may be written in a natural language, such as English, Spanish, Mandarin, or the like. Language model 110 may be prompted to generate responses to user query 200 in each language of a set of language. For example, the set of languages may include five natural languages, and language model 110 may generate responses to the user query 200 written in each of the five languages. To prompt language model 110 to generate responses in each language of the set of languages, user query 200 may be modified, such as by a processor associated with language model system 100, to include instructions to provide a response to the query in a first language of a set of languages. Then, user query 200 may be modified to include instructions to provide a response in a second language of the set of languages, and so on. Otherwise, user query 200 may be modified to include instructions to provide responses in a plurality of languages (e.g., a single prompt may be provided for multiple languages rather than separate prompts for each language). Each modified version of user query 200 (or a single modified version of user query 200) may be provided to language model 110, and language model 110 may generate responses in each language of the set of languages based on the version(s) of user query 200. In some embodiments, the set of languages includes the language in which user query 200 is written.

As discussed above, language model 110 may comprise a machine learning model such as an LLM or RNN that is trained to generate responses to queries received from users. Language model 110 may be trained through a supervised, semi-supervised, unsupervised, and/or "few-shot" learning process. Language model 110 may generate responses 205 to user query 200 in each language of the set of languages. For example, response 205A may be a response written in a first language, response 205B may be a response written in a second language, etc. Language model 110 may be trained to generate responses 205 in different languages based on multiple corpuses 225 of written information, each corpus corresponding to a different language. For example, a French corpus may include content written in French that is taken from online sources such as websites. Generating a response in French requires language model 110 to "think" in French (i.e., to generate the response according to "thinking" that is based on the French corpus). Accurate responses generated by language model 110 may be generally semantically consistent regardless of language, because accurate responses are likely to be based on facts that are consistent across the corpuses of various languages. However, hallucinatory responses may generally exhibit a large degree of variance compared to responses in other languages. This may occur because hallucinatory responses may not be based on information that is consistent across multiple language corpuses and may instead be created by language model 110 making inaccurate guesses based on information within the corpus corresponding to a particular language. In other words, when language model 110 "thinks" in a particular language, a hallucinatory response that language model 110 generates in that language will contain substantial semantic differences compared to hallucinatory (or even correct) responses that language model 110 generates in other languages.

Responses 205 may be provided to embedding generator 120. Embedding generator 120 may comprise an embedding model, such as a neural network or other type of machine learning model that learns a representation (embedding) for an entity through a training process that trains the neural network based on a data set, such as a plurality of features of a plurality of entities. As discussed above, embeddings generally refer to a vector representation of an entity that represents the entity as a vector in n-dimensional space such that similar entities are represented by vectors that are close to one another in the n-dimensional space. In one example, embedding generator 120 comprises a Bidirectional Encoder Representations from Transformer (BERT) model, which involves the use of masked language modeling to determine embeddings. In a particular example, embedding generator 120 comprises a Sentence-BERT model. In other embodiments, embedding generator 120 may involve embedding techniques such as Word2Vec and GloVe embeddings. These are included as examples, and other techniques for generating embeddings are possible. Embedding generator 120 may generate embeddings 210 of each response 205A-Z.

The response embeddings 210 may be provided to embedding comparison engine 130. Embedding comparison engine 130 may comprise one or more processors that are configured to compare response embeddings 210 to determine the degree of semantic similarity between the responses 205. For example, response embeddings 210 may be compared by evaluating the average distance (e.g., based on cosine similarity and/or other Euclidean distance determination) or standard deviation of the distance between pairs of embeddings within response embeddings 210 and/or an average or other aggregation of the respective distance or other similariy measure between the response embedding 210 corresponding to the target language (e.g., the language of user query 200) and each other embedding 210. In some embodiments, embedding comparison engine 130 may apply a clustering algorithm to the response embeddings 210. For example, k-means clustering may be applied to the response embeddings 210. Other techniques for comparing embedding similarity known in the art may be used as well.

The result of the embedding comparison may be provided to hallucination response engine 140. If the semantic similarity of the response embeddings 210 is within a threshold, hallucination response engine 140 may determine that the responses 205 do not contain a hallucination, and a response corresponding to the language associated with the user query 200 may be provided to the user (e.g., via user interface 104 of FIG. 1). If the degree of semantic similarity fails to meet the threshold, hallucination response engine 140 may determine that a hallucination has occurred. The results of applying a clustering algorithm may be used to determine whether a hallucination occurred. For example, if one response in one language is far away from several other responses in a cluster, this may indicate that only one language resulted in a response with a hallucination, and the other responses are accurate. In some embodiments, if the average or median distance from a given response's embedding to the other embeddings is greater than a threshold, then the given response may be determined to be a hallucination. In certain embodiments, if the average or median distance between each pair of embeddings in response embeddings 210 is above a threshold, if the standard deviation of such distances exceeds a threshold, and/or if the variance among response embeddings 210 is otherwise determined to exceed a threshold, all of the responses may be determined to include a hallucination.

Hallucination response engine 140 may include indication engine 215. Indication engine 215 may comprise one or more processors configured to provide a user with an indication that a hallucination has occurred in a response 205 (e.g., via user interface 104 of FIG. 1). For example, a response that has been determined to contain a hallucination may be provided to the user, along with the indication that the response contains a hallucination. The indication may comprise, for example, a warning message displayed on a user interface. The indication may include suggestions for creating queries that are less likely to result in hallucinations. The indication may also include the result of applying a clustering algorithm to the response embeddings 210, an indication of the semantic similarity information that was used to determine that the response contains a hallucination, and/or a confidence score associated with the response that is calculated based on such clustering and/or semantic similarity information. Providing users with a cluster graph, semantic similarity information, and/or a confidence score can provide users with additional insights as to how likely it is that the response contains a hallucination.

Hallucination response engine 140 may include language model training engine 220. Language model training engine 220 may comprise one or more processors that are configured to re-train or fine-tune language model 110 based on detected hallucinations. For example, language model training engine 220 may adjust one or more parameters of language model 110, such as temperature. Language model training engine 220 may also re-train language model 110, such as through a supervised, unsupervised, semi-supervised, and/or "few shot" learning process based on one or more detected hallucinations (e.g., using a detected hallucination as a negative training example and/or using updated training data generated and/or received based on a detected hallucination, such as based on input from a user).

Supervised learning techniques generally involve providing training inputs to a machine learning model. The machine learning model processes the training inputs and outputs predictions based on the training inputs. The predictions are compared to the known labels associated with the training inputs to determine the accuracy of the machine learning model, and parameters of the machine learning model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for a machine learning model, such as based on validation data and test data, as is known in the art.

In few shot learning, a pre-trained machine learning model that has not necessarily been trained for a specific domain or purpose is provided with a relatively small number (e.g., relative to the amount of training data that is used to train the model overall) of labeled training data instances for that specific domain or purpose in order to prime the pre-trained machine learning model to make a prediction for a given set of input features relating to that specific domain or purpose. For example, the relatively small number of training data instances may be provided as part of a prompt to the pre-trained machine learning model along with the input features for which a prediction or inference is being requested, and the pre-trained machine learning model uses the relatively small number of training data instances as in-context reference points that assist in making a prediction based on the input features. Thus, according to techniques described herein, a training data instance comprising generated responses with identified hallucinations may be provided to one or more language models of language model system 100 in order to train the language models to avoid hallucinations.

In certain embodiments, one or more languages may be removed from the set of languages based on comparing responses written in different languages. For example, based on comparing clusters generated by applying a clustering algorithm to embeddings of responses, it may be determined that a particular language is more prone to causing hallucinations than other languages and/or is an outlier in a particular case. Based on this determination, the language may be removed from the set of languages. Removing languages that are prone to hallucination and/or otherwise are outliers in particular cases may decrease the number of false positive hallucination determinations. The detecting and removing of languages prone to causing hallucinations and/or that are outliers may be performed by one or more processors associated with language model system 100.

In some embodiments, hallucination response engine 140 may generate one or more updated responses after detecting a hallucination in one or more responses. For example, hallucination response engine 140 may prompt language model 110 to generate one or more new responses (e.g., in one or more languages) using an updated prompt (e.g., based on an updated user query provided by a user and/or including an indication that one or more previous responses were determined to contain a hallucination) and/or after re-training or fine-tuning of the language model 110. Embeddings of the one or more new responses may be compared in a similar manner to that described above to determine whether the one or more new responses contain a hallucination. If a new response (e.g., in the target language) is determined not to contain a hallucination, it may be provided to the user via the user interface and/or a response determined to contain a hallucination may be provided to the user along with an indication that the response may contain a hallucination.

Example Operations Related to Detecting Hallucinations in Language Model Outputs FIG. 3 depicts example operations 300 related to detecting hallucinations in language model outputs. For example, operations 300 may be performed by one or more of the components described with respect to FIG. 1 or FIG. 2.

Operations 300 begin at step 302 with receiving a user query.

Operations 300 continue at step 304 with prompting a language processing machine learning model to generate responses to the user query in each language of a set of multiple languages. According to certain embodiments, one language of the set of multiple languages is a language associated with the user query. In certain embodiments, the language processing machine learning model comprises a Large Language Model (LLM). Some embodiments provide that, based on the determining that the response contains the model hallucination, one or more parameters of the LLM are adjusted. In some embodiments, a language is removed from the set of multiple languages based on applying a clustering algorithm.

Operations 300 continue at step 306 with receiving the responses from the language processing machine learning model in response to the prompting.

Operations 300 continue at step 308 with creating embedding representations of the responses.

Operations 300 continue at step 310 with calculating, based on the embedding representations, a degree of semantic similarity between the responses. Certain embodiments provide that calculating the degree of semantic similarity between the responses is further based on calculating a standard deviation among the embedding representations and/or among distances between the embedding representations. According to some embodiments, calculating the degree of semantic similarity between the responses is further based on applying a clustering algorithm to the embedding representations.

Operations 300 continue at step 312 with determining that a response of the responses contains a model hallucination based on comparing the degree of semantic similarity between the responses to a threshold. In some embodiments, one or more additional responses are generated based on the determining that the response contains the model hallucination. In certain embodiments an indication is provided to a user that the response contains a hallucination based on determining that a response contains a hallucination.

Figure 4:
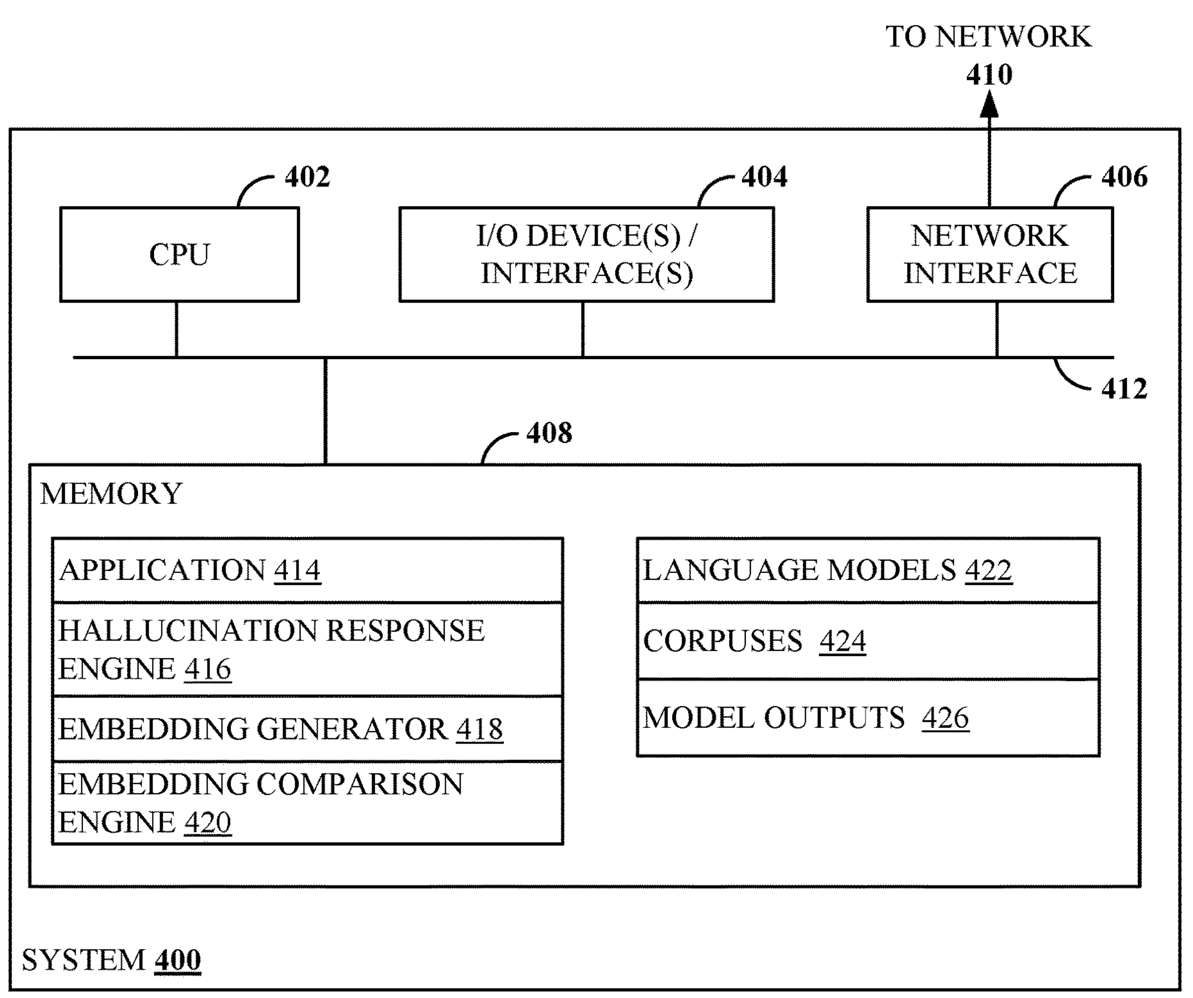
FIG. 4 depicts an example of a processing system for detecting hallucinations in language model outputs.

Example of a Processing System for Detecting Hallucinations in Language Model Outputs FIG. 4 illustrates an example system 400 with which embodiments of the present disclosure may be implemented. For example, system 400 may be configured to perform operations 300 of FIG. 3 and/or to implement one or more components as in FIG. 1 or FIG. 2.

System 400 includes a central processing unit (CPU) 402, one or more I/O device interfaces that may allow for the connection of various I/O devices 404 (e.g., keyboards, displays, mouse devices, pen input, etc.) to the system 400, network interface 406, a memory 408, and an interconnect 412. It is contemplated that one or more components of system 400 may be located remotely and accessed via a network 410. It is further contemplated that one or more components of system 400 may comprise physical components or virtualized components.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, and memory 408. CPU 402 is included to be representative of a single CPU, multiple CPUs, a single CPU having multiple processing cores, and other arrangements.

Additionally, the memory 408 is included to be representative of a random access memory or the like. In some embodiments, memory 408 may comprise a disk drive, solid state drive, or a collection of storage devices distributed across multiple storage systems. Although shown as a single unit, the memory 408 may be a combination of fixed and/or removable storage devices, such as fixed disc drives, removable memory cards or optical storage, network attached storage (NAS), or a storage area-network (SAN).

As shown, memory 408 includes application 414, hallucination response engine 416, embedding generator 418, and embedding comparison engine 420. In some embodiments, application 414 may be representative of a software application associated with a user's computing device. Hallucination response engine 416 may be representative of hallucination response engine 140 of FIG. 1 and FIG. 2. Embedding generator 418 may be embedding generator 120 of FIG. 1 and FIG. 2. Embedding comparison engine 420 may be embedding comparison engine 130 of FIG. 1 and FIG. 2.

Memory 408 further comprises language models 422 which may correspond to language model 110 of FIG. 1, or FIG. 2. Memory 408 further comprises corpuses 424, which may correspond to corpuses 225 of FIG. 2. Memory 408 further comprises model outputs 426, which may correspond to responses 205A-Z of FIG. 2 or response embedding 210 of FIG. 2.

It is noted that in some embodiments, system 400 may interact with one or more external components, such as via network 410, in order to retrieve data and/or perform operations.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of detecting hallucinations in language model outputs, comprising:

receiving a user query;

prompting a language processing machine learning model to generate a response to the user query in each language of a set of multiple languages;

generating the response in each language of the set of multiple languages via the language processing machine learning model in response to the prompting;

creating embedding representations of the generated responses;

calculating, based on the embedding representations, a degree of semantic similarity between the generated responses; and determining that a response of the responses contains a model hallucination based on comparing the degree of semantic similarity between the generated responses to a threshold.

2. The method of claim 1, wherein one language of the set of multiple languages is a language associated with the user query.

3. The method of claim 1, wherein, based on the determining that the response contains the model hallucination, one or more additional responses are generated.

4. The method of claim 1, wherein the language processing machine learning model comprises a Large Language Model (LLM).

5. The method of claim 4, wherein, based on the determining that the response contains the model hallucination, one or more parameters of the LLM are adjusted.

6. The method of claim 1, further comprising, based on the determining that the response contains the model hallucination, providing an indication to a user that the response contains a hallucination.

7. The method of claim 1, wherein calculating the degree of semantic similarity between the generated responses is further based on calculating a standard deviation among the embedding representations.

8. The method of claim 1, wherein calculating the degree of semantic similarity between the generated responses is further based on applying a clustering algorithm to the embedding representations.

9. The method of claim 8, wherein a language is removed from the set of multiple languages based on the applying of the clustering algorithm to the embedding representations.

10. A method of detecting hallucinations in language model outputs, comprising:

receiving a user query;

prompting a large language model (LLM) to generate a response to the user query in each language of a set of multiple languages, wherein one language of the set of multiple languages is a language associated with the user query;

creating embedding representations of the generated responses;

calculating, based on the embedding representations, a degree of semantic similarity between a response of the responses that is in the language associated with the user query and a different response of the responses that is in a different language than the language associated with the user query;

determining that the response that is in the language associated with the user query contains a model hallucination based on the degree of semantic similarity failing to meet a threshold; and generating a new response or a notification based on the determining that the response that is in the language associated with the user query contains the model hallucination.

11. The method of claim 10, wherein, based on the determining that the response contains the model hallucination, one or more parameters of the LLM are adjusted.

12. A system for detecting hallucinations in language model outputs, comprising:

one or more processors; and a memory comprising instructions that, when executed by the one or more processors, cause the system to:

receive a user query;

prompt a language processing machine learning model to generate a response to the user query in each language of a set of multiple languages;

generate the response in each language of the set of multiple languages via the language processing machine learning model in response to the prompting;

create embedding representations of the generated responses;

calculate, based on the embedding representations, a degree of semantic similarity between the generated responses; and determine that a response of the generated responses contains a model hallucination based on comparing the degree of semantic similarity between the generated responses to a threshold.

13. The system of claim 12, wherein one language of the set of multiple languages is a language associated with the user query.

14. The system of claim 12, wherein, based on the determining that the response contains the model hallucination, one or more additional responses are generated.

15. The system of claim 12, wherein the language processing machine learning model comprises an LLM.

16. The system of claim 15, wherein one or more parameters of the LLM are adjusted based on determining that the response contains the model hallucination.

17. The system of claim 12, further comprising, based on the determining that the response contains the model hallucination, providing an indication to a user that the response contains a hallucination.

18. The system of claim 12, wherein calculating the degree of semantic similarity between the generated responses is further based on calculating a standard deviation among the embedding representations.

19. The system of claim 12, wherein calculating the degree of semantic similarity between the generated responses is further based on applying a clustering algorithm to the embedding representations.

20. The system of claim 19, wherein a language is removed from the set of multiple languages based on the applying of the clustering algorithm to the embedding representations.

* * * * *